United States Patent [19]

Johnson et al.

[11] Patent Number: 4,862,005
[45] Date of Patent: Aug. 29, 1989

[54] APPARATUS FOR DETECTING RADIOACTIVE CONTAMINANTS ON HAND TOOLS

[75] Inventors: Alfred N. Johnson, Voorhees; Martin D. Humphrey, Vicentown, both of N.J.

[73] Assignee: Westinghouse Electric Corp., Pittsburgh, Pa.

[21] Appl. No.: 201,808

[22] Filed: Jun. 2, 1988

[51] Int. Cl.$^4$ .................... G21F 3/00; G01T 1/185
[52] U.S. Cl. ........................ 250/385.1; 250/336.1; 250/379; 250/515.1; 250/394
[58] Field of Search ............... 250/336.1, 394, 374, 250/385.1, 515.1, 379

[56] References Cited

U.S. PATENT DOCUMENTS

| | | | |
|---|---|---|---|
| 4,253,025 | 2/1981 | Fergus | 250/385.1 |
| 4,352,019 | 9/1982 | Pollard | 250/366 |
| 4,464,978 | 3/1987 | Johnson et al. | 209/576 |
| 4,599,513 | 7/1986 | Prisco et al. | 250/336.1 |
| 4,658,142 | 4/1987 | Johnson et al. | 250/394 |
| 4,679,738 | 7/1987 | Prisco et al. | 209/576 |
| 4,695,728 | 9/1987 | Gibes | 250/336.1 |

OTHER PUBLICATIONS

Advertisement entitled "Waste Sorting Table" by National Nuclear Corporation, Mountain View, Calif., undated.
Advertisement entitled "CBO 800" by Nardeux, undated.

*Primary Examiner*—Carolyn E. Fields

[57] ABSTRACT

An apparatus for detecting radioactive contamination in hand-held objects, such as tools used to service a nuclear power facility, is disclosed herein. The apparatus generally comprises a radiation detector assembly having a gas-flow proportional detector, and a platform assembly formed from a preforated sheet of rigid material disposed over the topside of the detector for both supporting the hand-holdable objects and uniformly spacing the object from the detector. The radiation detector assembly is contained within a shielding cabinet having an access opening that is offset out of alignment with the top side of the detector for allowing an operator to deposit and withdraw an object onto and off of the platform. The walls of the shielding cabinet include pocket-like mounting assemblies for releasably holding one or more sheets of lead shielding material so that the amount of background radiation-reducing shielding may be advantageously adjusted. The shielding cabinet further includes a pair of cabinet doors on opposite sides of the cabinets which swing down into a horizontal position which is substantially in alignment with the top surface of the detector. The extra access openings provided in the cabinet, along with the shelf-like support afforded by the swung-down cabinet doors allows objects that are longer than the width of the cabinet to be easily drawn over the top surface of the detector and scanned thereby. Finally, the apparatus includes a space gas-flow proportional radiation detector that undergoes a constant purging with counting gas so that it may immediately replace the primary detector in the event of a malfunction, thereby minimizing downtime.

37 Claims, 6 Drawing Sheets

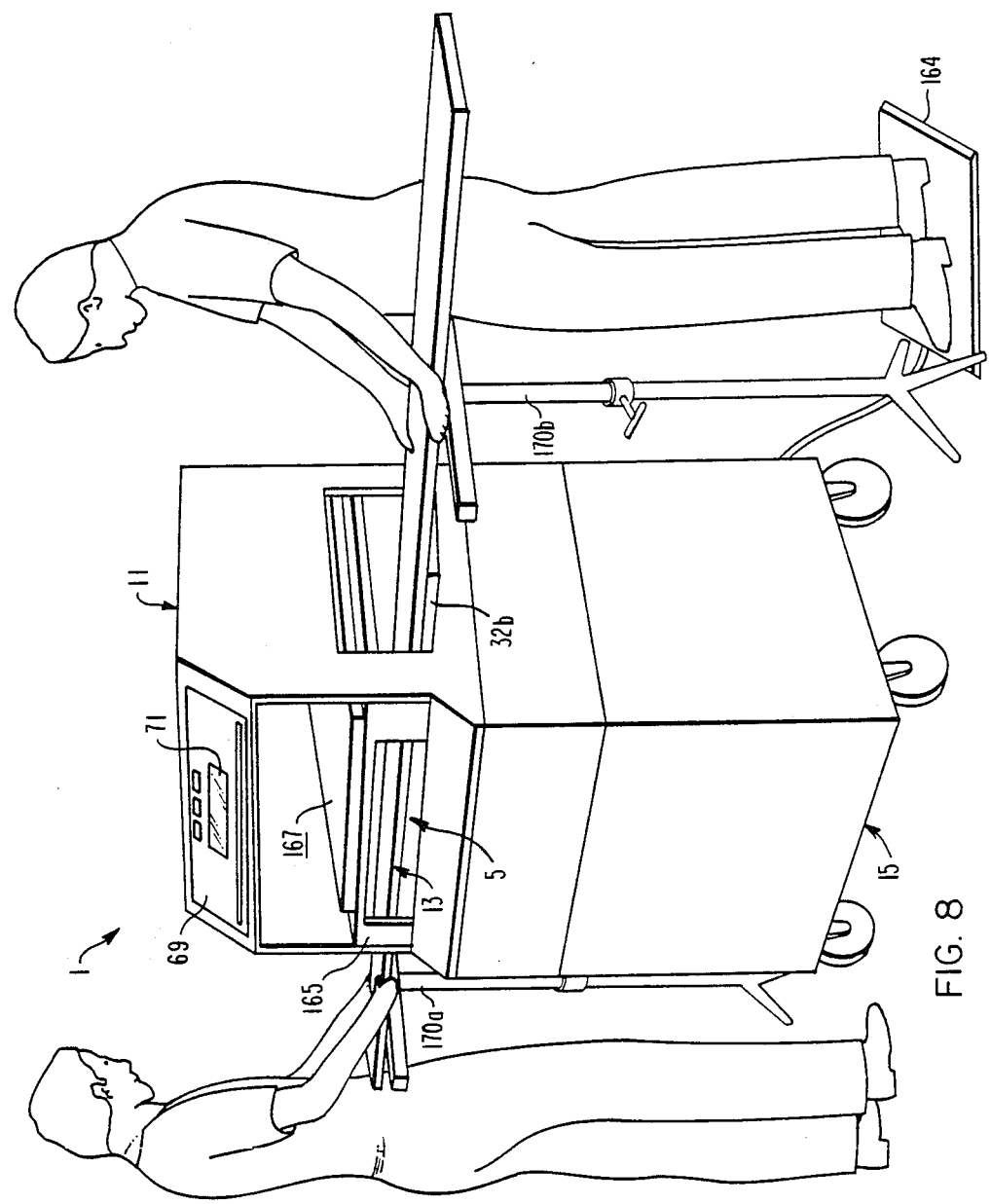

APPARATUS FOR DETECTING RADIOACTIVE CONTAMINANTS ON HAND TOOLS

BACKGROUND OF THE INVENTION

This invention generally relates to devices for detecting radioactive contamination in hand-holdable objects, such as the tools that are used to service a nuclear power facility.

Devices for detecting radioactive contamination in small objects are known in the prior art. Such devices are generally known in the art as "friskers," and are often used to check whether or not a tool or other object which has been subjected to a decontamination process has in fact been rendered completely free of such radioactive contaminants. Generally, such devices comprise a radiation detector (which may be either a gas-flow proportional detector or a scintillation-type detector) mounted on a short, table-like structure. The tools or other hand-held objects to be tested are placed over the radiation detector, which scans them for radioactive contaminants. In some devices, a second radiation detector is disposed over the first detector, so that radiation readings from both the bottom and top surfaces of the tool or other object may be taken simultaneously. Such a dual-detector configuration has the advantage of detecting contaminants which emit radiation from only one side of the tool, as can happen when a radioactive particle is lodged within a crevice of the tool. The successful operation of such radiation detection devices is important, since the failure of such a device to detect the presence of radioactive contaminants could result in the lodgment of radioactive particles in the skin of one of the facility operators.

While there are frisker-type radiation detectors in the prior art which are generally capable of satisfactorially determining whether or not a particular tool or other object emits an unacceptably high amount of radioactivity, the applicants have observed a number of shortcomings in these prior art devices. One such shortcoming is the manner in which these devices solve the problem of preventing the radiation alarm circuits from being spuriously actuated by background radiation. This is a serious problem as such frisker-type detectors are often operated in or adjacent to the decontamination rooms of nuclear facilities, where tools and other objects awaiting decontamination radiate a significant amount of gamma radiation throughout the room. To prevent such spurious triggering of radiation alarm circuitry, some of these devices exclusively rely upon a microprocessor which has been programmed to periodically sample the background gamma radiation, and to subtract the sampled background radiation value from the readings obtained from the frisker-type radiation detector as the objects are being examined thereby. While exclusive reliance upon "background subtraction" obviates the need for providing a thick and heavy lead shield around the radiation detector to block out the background radiation, it can also cause the device to give inaccurate or false readings since background gamma radiation in a nuclear facility is very much subject to considerable, moment-to-moment fluctuations caused by the movement of contaminated equipment in or around the detector of the device. To overcome the shortcomings associated with the exclusive reliance upon background subtraction, a few prior art designs provide partial shielding around the radiation detector. However, the shielding in the hoods of every such detector that the applicants are aware of affords such incomplete protection so as to only marginally reduce the dependency upon "background subtraction."

Other shortcomings associated with many of the prior art frisker-type radiation detector devices are the result of the type of radiation detectors used in such devices. Single-zone gas-flow proportional detectors are incapable of informing the operator whether the radiation emitted by the tool or other object is the result of a single, localized "hot particle," or is the result of a contaminant that is uniformly spread over the surface of the tool. Still another problem associated with single-zone gas-flow proportional detectors is the relatively low signal to noise ratio that such detectors yield when placed in a substantial field of background radiation. Some prior art designs have attempted to remedy the deficiencies associated with single-zone detection by providing a bank of separate, scintillation-type detectors. However, such detector banks are apt to have "dead zones" in certain areas between adjacent detectors which are blind to radiation, thereby affording an opportunity for a "hot particle" to escape detection. Additionally, the fragility of the thin plastic "windows" used in such detectors makes them very easy to break when a hard, heavy and sharp object is placed on them. Attempts have been made to solve the fragility problem by using thicker windows of plastic. However, the use of such thick plastic panes desensitizes the detectors to beta radiation, thereby forcing the detector to rely exclusively upon its sensitivity to gamma radiation in making its measurements. Such exclusive reliance upon gamma radiation disadvantageously decreases the signal to noise ratio of the detector and greatly increases the time necessary for the detectors to determine the amount of radiation emitted by the tool being scanned.

Finally, many of the frisker-type detectors of the prior art must be manually actuated prior to and during operation by the manipulation of buttons on a control panel. Applicants have observed that the button configurations in such control panels often provides a situs where radioactive debris and airborne particles can contaminate the device.

Clearly, what is needed is a frisker-type radiation detector apparatus which is capable of accurately, reliably and consistently detecting the presence of radioactive material on tools and other objects. Ideally, such a radiation detector should have a plurality of mutually-contiguous or overlapping radiation-sensitive zones so that the existence and location of one or more "hot particles" in a particular tool or other object may be reliably determined. Additionally, the device should have some sort of means for cancelling out the effects of background radiation on the detector which minimizes reliance upon computerized "background subtraction." Finally, it would be desirable if such a device could be easily operated without the need for manipulating manual controls which, as pointed out previously, can afford a situs of potential radiation contamination.

SUMMARY OF THE INVENTION

Generally speaking, the invention is an apparatus which overcomes the shortcomings associated with prior art frisker-type radiation detector devices. The apparatus comprises a radiation detector assembly including a detector having a top side that is sensitive to both beta and gamma radiation throughout substantially all of its area, and a platform screen disposed over the topside of the detector for both supporting the handholdable object being examined and for uniformly spacing the object from the detector. A shielding cabinet is further provided for shielding the detector from a large part of the ambient background radiation, thereby reducing the dependency of the detector assembly on background subtraction. The shielding cabinet is provided with an access opening for allowing an operator to deposit and withdraw an object onto and off of the platform screen.

The detector is preferably a gas-flow proportional detector having a plurality of mutually adjacent radiation detecting zones, each of which is independently sensitive to radioactivity. The division of the topside of the detector from a single to a plurality of radiation sensitive zones advantageously desensitizes the detector to the effects of background radiation, and further assists the operator in ascertaining whether the contamination is localized or uniformly spaced, and if localized, the particular portion of the object that is contaminated with radioactive particles. In the preferred embodiment, the gas-flow proportional detector is formed from a single conductive housing that forms the cathode, and a plurality of parallel, fork-shaped electrodes disposed within the housing, each of which forms an individually powered and individually monitored anode. To minimize downtime in the event of a malfunction in the detector, the apparatus may include a spare gas-flow proportional detector that is fluidly connected to the same source of pressurized counting gas as the main detector so as to provide a fully-purged and readily operable backup detector at all times.

The platform screen is preferably formed from a sheet of perforated and structurally strong material, such as a sheet of perforated stainless steel. The area of the openings in the sheet may take up at least 60 percent of the area of the sheet to render the platform substantially conductive to beta radiation. Additionally, a removable protective screen may be disposed between the platform means and the radiation detector. The protective screen may include a film of thin, strong and flexible plastic material, such as Mylar ® having a thickness of between about 0.2 and 0.8 mg/cm$^2$. The protective screen may further include a support grid that defines a number of small individual "window panes" in the sheet plastic and uniformly supports it across the top side of the detector. The sheet of perforated stainless steel and the support grid coact to form a single, strong platform capable of both supporting heavy hand tools and preventing any sharp edges or corners of these tools from puncturing the thin plastic sheet material disposed over the top side of the detector.

The shielding cabinet preferably includes a sheet of shielding material, which may be a lead plate, for shielding the detector from background radiation and for "back scattering" a portion of the gamma radiation that the top side of the detector is exposed to in order to increase the gamma radiation sensitivity of the detector. The walls of the shielding cabinet are preferably hollow so as to define pockets capable of removably receiving one or more sheets of lead shielding material. The pocket-like interior of these walls advantageously allows the amount of shielding afforded by a particular wall to be increased when the background radiation is particularly high or completely removed if the background radiation is very low. The shielding cabinet also includes cabinet doors on opposing sides, which, when opened, form a shelf surface that is substantially parallel with the top side of the detector so that objects longer than the width of the cabinet may be easily drawn over the detector and scanned for radioactive material. The apparatus may further include a shallow support table that is manually positionable within the interior of the shielding cabinet for supporting and spacing a second detector over the first detector. Spaces are provided between the legs of the shallow table so that elongated objects, such as scaffolding members, may be passed through openings provided by the opposing side cabinet doors between the two detectors.

Finally, the apparatus may include a mat-like foot switch for automatically actuating the detector within the radiation detector assembly when the operator steps up to the access opening in the shielding cabinet. The provision of such a mat-style foot switch obviates the need for the operator to depress buttons or to manipulate other controls to actuate and operate the device, thereby eliminating a situs of possible radioactive contamination.

BRIEF DESCRIPTION OF THE SEVERAL FIGURES

FIG. 8 illustrates how the apparatus may be used to detect the presence of radioactive contamination on elongated objects such as scaffold members.

DETAILED DESCRIPTION OF THE PREFERRED EMBODIMENT

Figure 1:
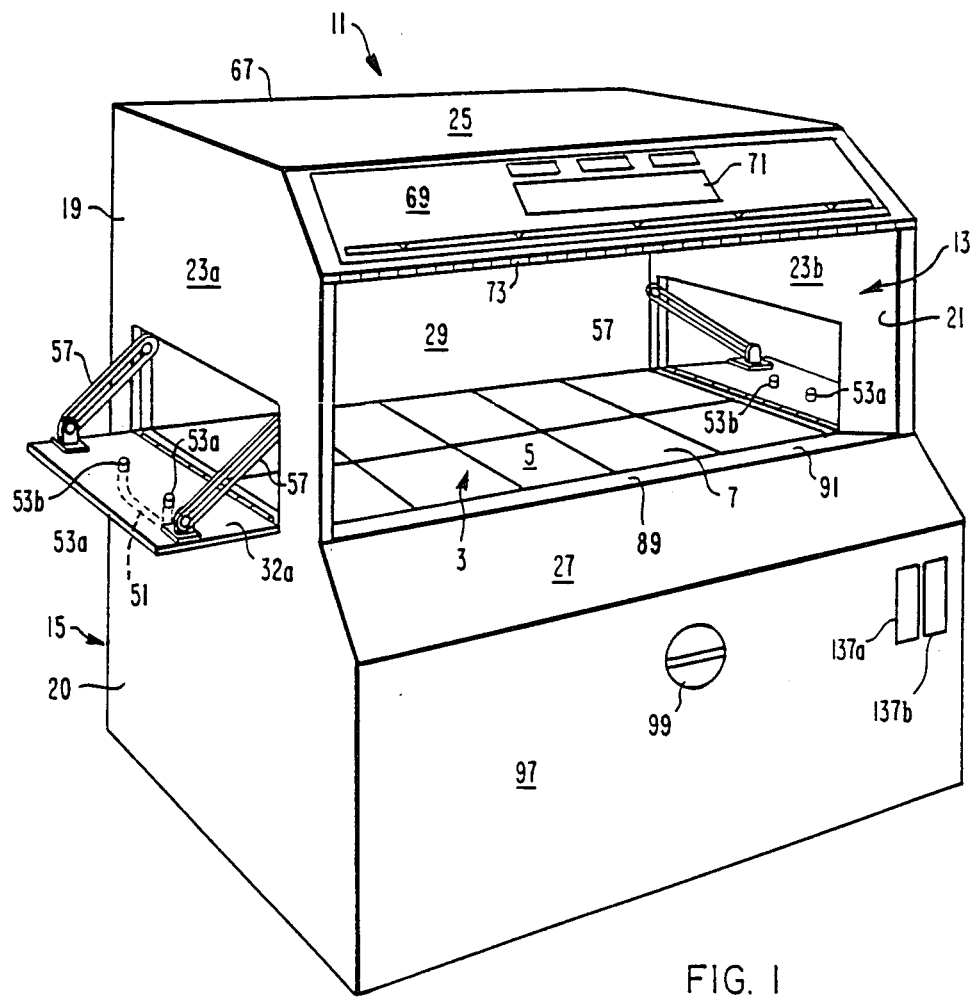
FIG. 1 is a perspective view of the inventive apparatus for detecting radiation in hand-holdable objects.
Figure 2A:
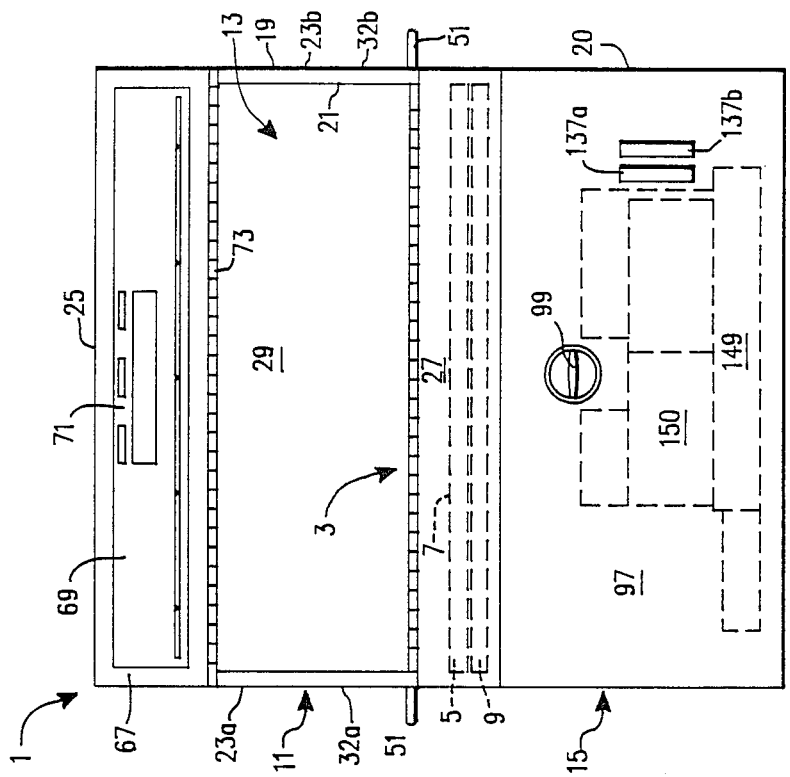
FIG. 2A is a front view of the radiation detection apparatus illustrated in FIG. 1.
Figure 2B:
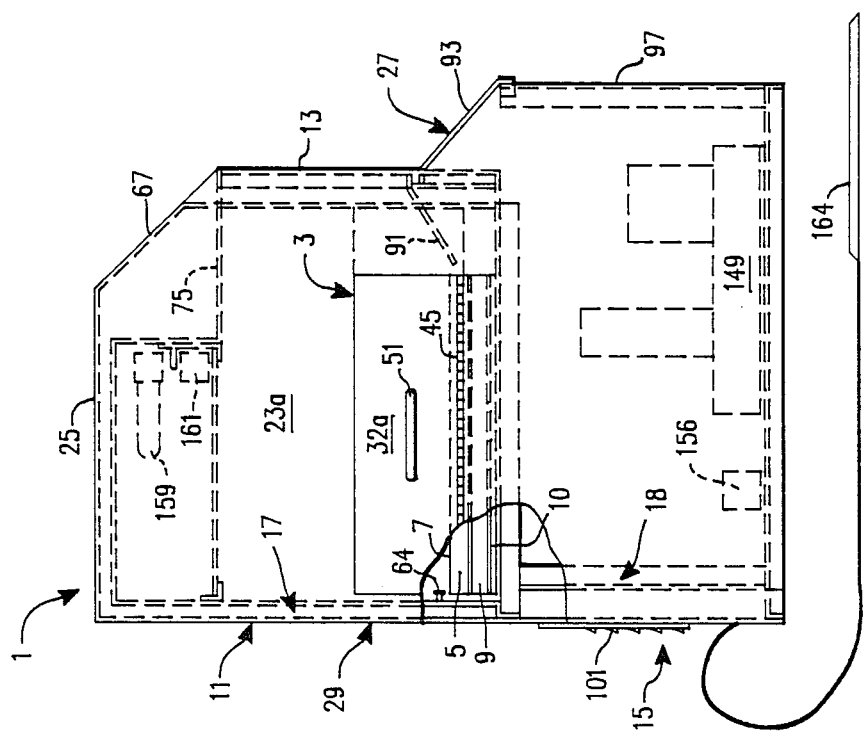
FIG. 2B is a side view of the apparatus illustrated in FIG. 1.

With reference now to FIGS. 1, 2A and 2B, wherein like numerals designate like components throughout all of the several figures, the radiation detector apparatus 1 of the invention comprises a radiation detector assembly 3 that includes a primary radiation detector 5 having a top side 7 where the objects to be tested are placed, and a spare detector 9 that is structurally identical to the primary detector 5 and stacked directly below it. As will be discussed in more detail hereinafter, both the primary and spare detectors 5 and 9 are preferably gas-flow proportional type detectors whose topsides 7 have five mutually overlapping zones, each of which is independently sensitive to radiation. To maximize the sensitivity of the detector 5, both the primary and the spare detectors 5, 7 are positioned on top of a one-half inch thick plate of lead shielding material 10 as is indicated in FIG. 2B. Such lead shielding material 10 reflects back some of the gamma radiation emitted toward it from a radioactive tool or other hand-held object, thereby giving the detector 5 two opportunities to count the reflected gamma ray. The particular radiation circuitry and pneumatic components which are connected to the detector 5 and which form the balance of the radiation detector assembly 3 are illustrated in schematic form in FIG. 7. These components will be described in detail hereinafter. The primary and spare detectors 5 and 9 are housed at the bottom of a shielding cabinet 11 having an access opening 13 for depositing and withdrawing the objects being tested. The shielding cabinet 11 overlies a support cabinet 15. The purpose of the shielding cabinet 11 is to substantially attenuate the amount of the background gamma radiation which impinges upon the detector 5, while the purpose of the support cabinet 15 is to raise the access opening 13 of the shielding cabinet 11 to a convenient height for the system operator, as well as to prevent airborne debris and other dust from entering the components of the radiation detector assembly contained therein.

Both the shielding cabinet 11 and the support cabinet 15 are formed from a frame of angular support members 17, 18 which is covered with smooth, easily decontaminable stainless steel sheet material 19, 20. In the shielding cabinet 11, inner sheets of stainless steel 21 are provided to form flat, rectangular support pockets capable of holding one or more lead sheets for shielding purposes, as will be described presently.

Figure 3:
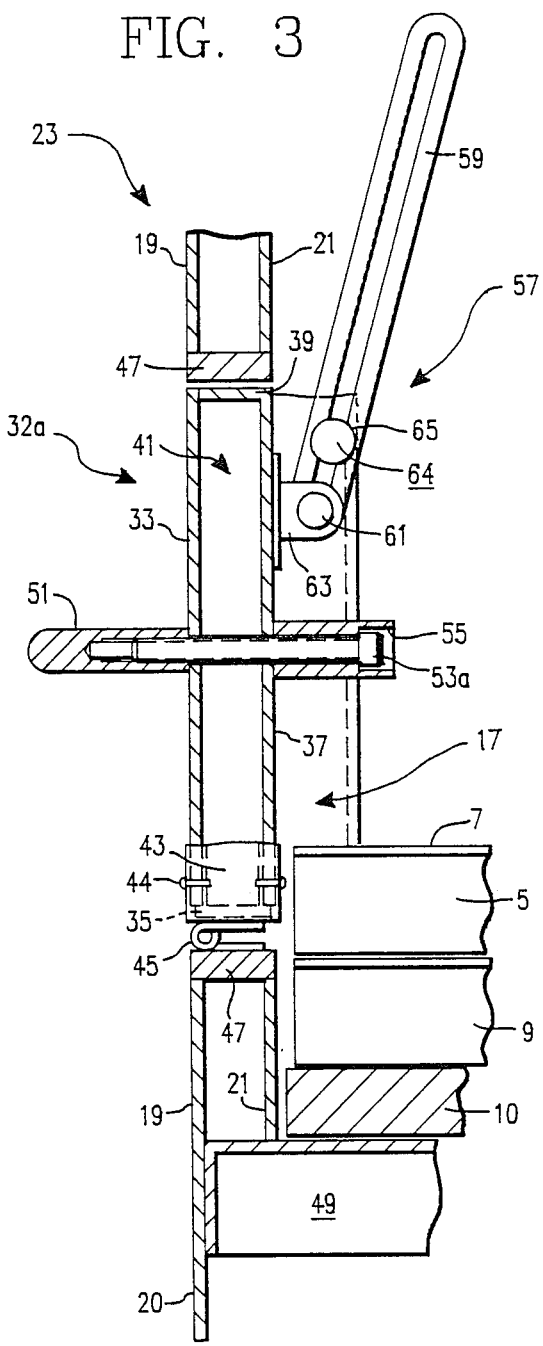
FIG. 3 is a cross-sectional side view of the cabinet door of the apparatus along the line 3—3 in FIG. 2B.

The shielding cabinet 11 includes a pair of opposing side walls 23a, 23b, a top wall 25, a short front wall 27 which is bordered by two opposing U-shaped brackets 28a, 28b and which defines the bottom edge of the access opening 13, and a back wall 29. Each of the side walls 23a, 23b includes a cabinet door 32a, 32b which is capable of pivoting downwardly 90 degrees and forming a support shelf as is best seen in FIG. 1. With reference now to FIG. 3, each of the cabinet doors 32a, 32b is formed from an outer sheet of stainless steel having an L bend 35 at its bottom edge, as well as spaced apart inner sheet of stainless steel 37 have an L bend 39 along its top edge. The outer and inner sheets 33, 37 of the cabinet door 32a form a flat, rectangular sheet-holding pocket 41 into which one or more sheets of lead or other shielding material may be placed. In the preferred embodiment, the sheet-holding pocket 41 is approximately 0.6 inches wide so that either one or two sheets of lead 0.25 inches thick may be slid therein. In one embodiment of the invention, a plate of 0.50 inch thick lead is welded within the doors 32a, 32b. However, in the alternative, an edge cap 43 may be provided that is detachably connected over an open side edge of the doors to allow the amount of lead shielding in the doors 32a, 32b to be adjusted. In the preferred embodiment, the edge cap 43 includes a pair of parallel, shallow flanges on either side that are insertable within and engagable against the inside surfaces of the sheets 33 and 37. The edge cap 43 is secured in place by a plurality of screws 44 (only one of which is shown) that extend through mutually registering bores in the flanges of the edge cap 43. Such edge caps 43 are preferably used along the upper edges of the side walls 23a, 23b, the top wall 25, front wall 27 and back wall 29 to secure one or two lead sheets in the pockets that exist in these walls.

A continuous hinge 45 connects the bottom edge of each of the cabinet doors 32a, 32b to the top edge of a cap member 47 that connects and spaces apart sheets 19 and 21 at the bottom portion of the side wall 23a. This bottom portion of the side wall 23a in turn rests on a lower floor panel 49 as shown. Disposed in the center portion of the cabinet door 32a is a shallow, U-shaped handle 51. This handle 51 is secured onto the door 32a by means of a pair of screws 53a, 53b which are threadedly engaged in bores 55 present at the ends of the handle 51. Disposed at the top edges of each of the doors 32a, 32b are opposing door support assemblies 57. The purpose of the support assemblies 57 is to prevent the doors 32a, 32b from pivoting any further than 90 degrees when the handle 51 of each is drawn downwardly, thereby rendering the doors 32a, 32b into shelves (as may best be seen in FIG. 1). The rendering of the cabinet doors 32a, 32b into shelves not only provides additionally access to the top surface 7 of the radiation detector 5; it further helps to support elongated objects (such as the long handles of certain tools, scaffolding members, etc.) that are longer than the width of the shielding cabinet 11 as they are drawn over the top surface 7 of the detector 5. Each door support assembly 57 includes an elongated link member 59 which is pivotally connected to the upper inside edge of each of the doors 32a, 32b by means of a pin 61 supported by a bracket 63. A rivet 64 is disposed within the slot defined along the center of the elongated link member 59. As is best seen in FIG. 2B, the shank of the rivet 64 is rigidly affixed to the frame 17 of the shielding cabinet 11. The head 65 of the rivet 64 prevents the link member 59 from sliding off of the shank of the rivet 64.

Figure 4:
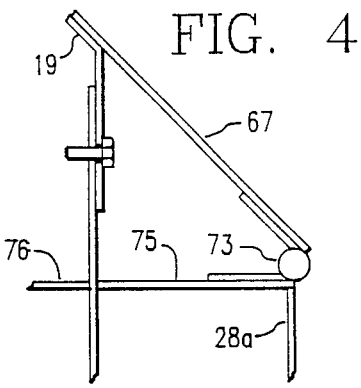
FIG. 4 is an enlarged, cross-sectional side view of the area circled at the intersection of the top and front walls of the apparatus in FIG. 2B.

With reference again to FIGS. 1, 2B and 2A, the top wall 25 of the shielding cabinet 11 includes an instrument panel support frame 67 for supporting the instrument panel 69 and detector readout 71 of the detector circuitry. With specific reference to FIG. 4, a continuous hinge 73 forms a pivotal connection between the bottom edge of the instrument panel support frame 67 and an upper floor panel 75. Under normal circumstances, the instrument panel support frame 67 lies on top of the outer sheet of stainless steel sheet 19 that forms the outer surface of the cabinet 11. However, if access is desired to the back of the instrument panel 69, the hinge 73 allows the instrument panel support frame 67 to be pivoted clockwise. To afford clearance for the display components which project off of the back side of the instrument panel 69, the central portion of the sheet 19 is removed along the tapered portion of the top wall 25.

Figure 5:
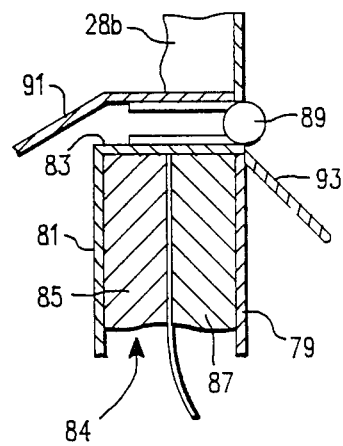
FIG. 5 is an enlarged, cross-sectional side view of the area of the front wall of the apparatus circled in FIG. 2B.

With references now to FIGS. 2B and 5, the front wall 27 of the shielding cabinet 11 includes an outer sheet 79 as shown, and an inner sheet 81 having an L bend 83 along its upper edge. The resulting flat, rectangular pocket 84 defined within the wall 27 can accommodate two sheets 85, 87 of lead shielding material, each of which is 0.25 inches thick. A continuous hinge 89 pivotally connects protective cover 91 to the upper edge of the top wall 27. The protective cover 91 protects the delicate gas fittings and cables (not shown) extending out of both the main and spare detectors 5 and 9. Because the distal edge of the protective cover 91 terminates along the outer edge of the top side 7 of the detector 5, protective cover 91 further advantageously provides a lead-in ramp to help the operator smoothly slide objects on to or off of the top surface 7. Protective cover 91 is preferably formed from stainless steel sheet metal due to the strength and corrosion resistance of this material.

As is most evident in FIGS. 2B and 3, the entire shielding cabinet 11 is supported by the frame 18 of the support cabinet 15. As has been previously indicated, the primary function of the support cabinet 15 is to raise the access opening 13 of the shielding cabinet 11 at an ergonometrically optimal height, as well as to house various components of the radiation detector assembly which are electrically and pneumatically connected to the detectors 5 and 9. However, to provide the access that is necessary for these components, the front side of the support cabinet 15 includes an access drawer 97. A handle is centrally connected to the front face of the drawer 97 as shown. To provide for an adequate amount of air cooling for the electronic components disposed within the cabinet 15, the back wall of this cabinet includes louvers 101. Although not specifically shown in any of the several figures, a thin sheet of filter material may be disposed over the inside surface of the louvers 101 to prevent the intrusion of dust and debris within the cabinet 15. To provide mobility for the apparatus 1, locking casters (shown in FIG. 8) may be connected to the bottom of the support cabinet 15. Such casters, if used, should be height adjustable so that the apparatus 1 may be easily rendered level if used on an unlevel surface.

Figure 6C:
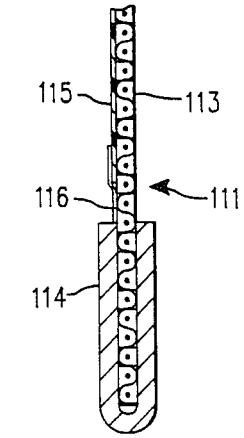
FIG. 6C is an enlarged cross-sectional side view of the frame of the platform screen illustrated in FIG. 6A along the line 6C—6C.
Figures 6A, 6B:
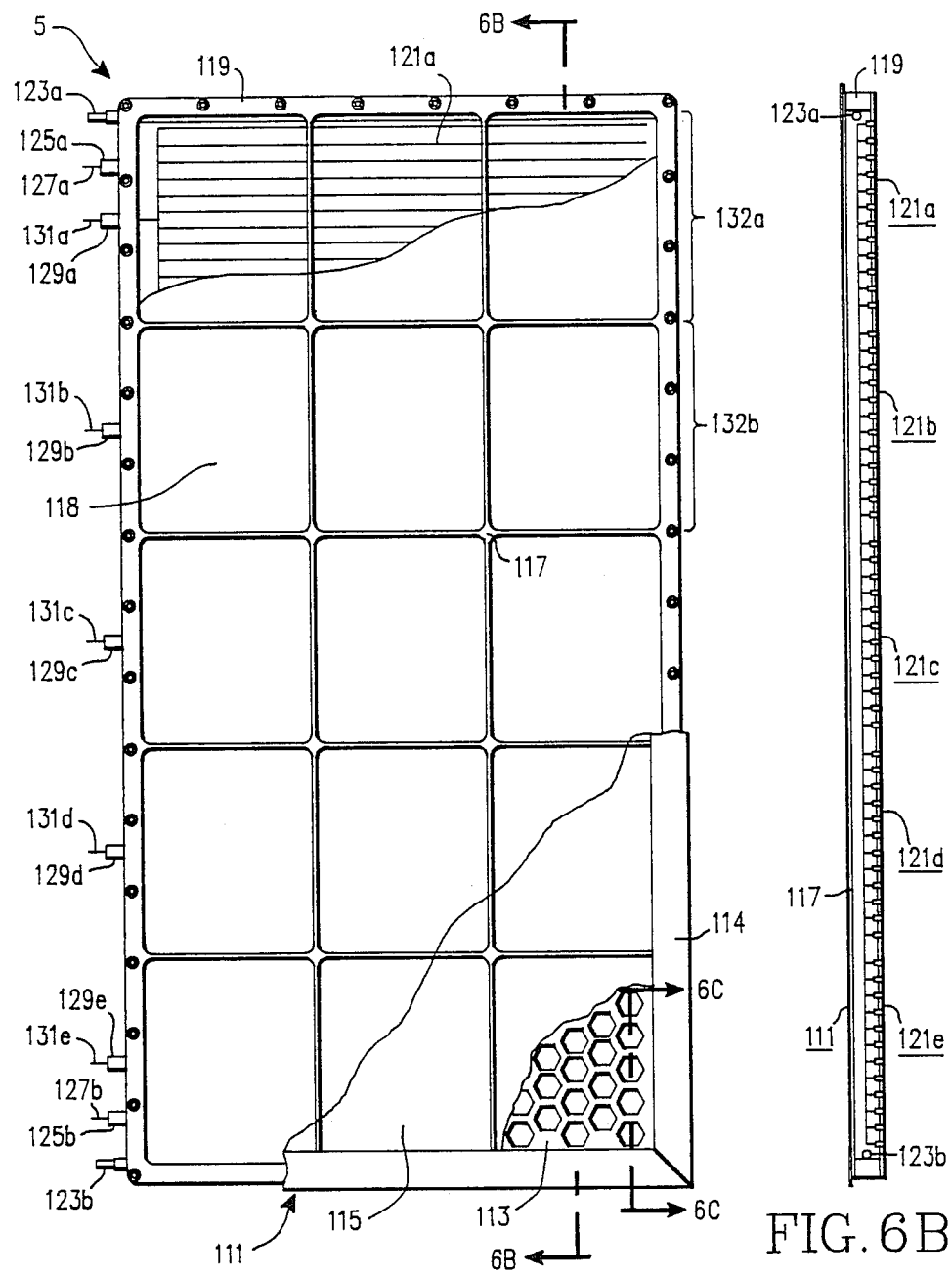
FIG. 6A is a plan view of the primary radiation detector of the radiation detector assembly of the apparatus, illustrating the constituent layers of sheet material forming the platform screen and the protective screen that are removably mounted over the top face of the detector.
FIG. 6B is a cross-sectional side view of the detector illustrated in FIG. 6A along the line 6B—6B.

With reference now to both FIGS. 6A and 6B, both the primary and spare detectors 5 and 9 include a platform screen assembly 111 disposed over their top sides 7. This component includes a screen member 113 formed from 22 gauge stainless steel having hexagonally shaped apertures as shown, each of which is about 0.25 inches across. The hexagonal cut-out pattern of the screen 113 maximizes the ratio of shear strength to open area. At least 60 percent and preferably 70 percent of the screen member 113 is open so that beta radiation can easily travel without significant impediment from a tool or other object placed on top of the assembly 111 to the radiation-sensitive zones of the detector 5 disposed therebelow. The screen member 113 of the platform screen assembly 11 is circumscribed by a rigidifying frame 114 which is preferably formed from sixteen gauge stainless steel crimped around the edge of the screen 113 in the manner illustrated both in FIGS. 6A and 6C. The platform screen assembly 111 advantageously includes a clear sheet of 0.25 mil thick Mylar ® 115 which is affixed by a strip of tape 116 disposed around the inner perimeter of the frame 114. The screen member 113 effectively prevents sharp corners of the tools or other objects deposited over the detector 5 from penetrating the aluminized sheet of Mylar ® 118 that seals the aluminum housing 119 of the detector 5 from the ambient atmosphere. The clear sheet of Mylar ® 115 disposed immediately beneath the screen member 113 keeps dirt and debris from accumulating on top of the aluminized Mylar ® 118. Immediately disposed beneath the platform screen assembly 111 is a support grid 117 that is preferably made from milled aluminum approximately one-fourth of an inch thick. This support grid 117 performs three functions. First, the reinforcement it offers to the platform screen assembly 111 greatly increases the amount of compressive load that can be borne by the screen member 113. Secondly, it coacts with the platform screen assembly 111 to space the side of a tool or other object being inspected a uniform distance from the top side 7 of the detector 5. Thirdly, it provides "windowpane" type support for the sheet of aluminized Mylar ® 118 disposed directly underneath it.

The support grid 117 is supported around its edges by the previously mentioned aluminum housing 119 of the detector 5. In the preferred embodiment, the aluminum housing 119 forms the cathode of detector 5, which is a gas-flow proportional radiation detector. Five, fork-shaped stainless steel electrodes form parallel and independent anodes 121a–121e within the enclosure defined by the interior of the aluminum housing 119 and the aluminized Mylar ® 118 sealingly disposed thereover. Small tubular manifolds 123a, 123b are disposed inside the aluminum housing 119 along its edges for uniformly distributing a counting gas which, in the preferred embodiment, is a mixture of 90 percent argon and 10 percent methane known as P-10 counting gas. Gas tight fittings 125a, 125b are provided at either end of the aluminum housing for connecting cathode lead wires 127a, 127b to the inside of the aluminum housing 119. Similarly, gas-tight fittings 129a–129e are provided in the housing 119 as shown for anode lead wires 131a–131e, each of which is connected at one end to one of the five, fork-shaped stainless steel electrodes 121a–121e. In the preferred embodiment, both the primary and spare detectors 5 and 9 are Model 43-67 gas proportional probes manufactured by Ludlum Measurements, Inc. located in Sweetwater, Tex. The independently charged, fork-shaped electrodes 121a–121e in combination with the oppositely charged aluminum housing 119 creates a gas proportional flow type radiation detector 5 having a plurality of mutually overlapping radiation sensitive zones 132a–132e (of which only 132a and 132b are indicated). As will be better appreciated hereinafter, each of the zones 132a–132e is advantageously independently sensitive to any gamma or beta radiation which traverses it.

Figure 7:
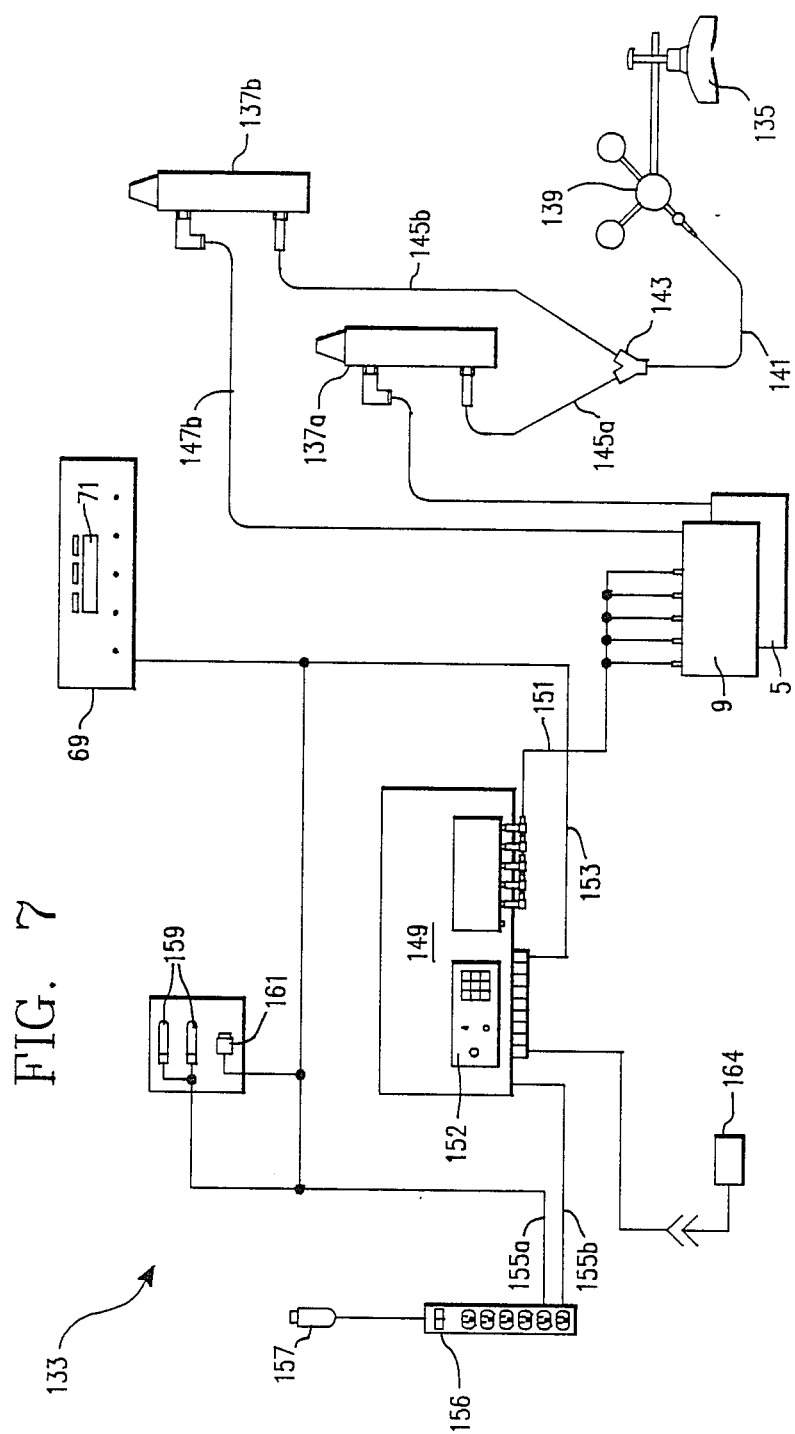
FIG. 7 is a schematic diagram of the radiation detector circuitry and pneumatic components used in the apparatus.

FIG. 7 illustrates the radiation detection circuitry and pneumatic components 133 which form the balance of the radiation detection assembly 3. These components include a source of pressurized counting gas which, as previously mentioned, is a mixture of 90 percent argon and and 10 percent methane. After flowing through a gas regulator 39, this gas enters a primary outlet line 141. A Y joint 143 bifurcates the flow of gas from the primary outlet line 141 into two inlet lines 145a and 145b, each of which is connected to the inlet of a flow meter 137a, 137b. The outlets of these flow meters 137a, 137b are in turn connected to the primary and the spare detectors 5 and 9, respectively. It should be noted that in operation, P-10 gas from the pressurized gas source 135 continuously flows through the spare detector 9 during the use of the primary detector 5, thereby obviating the need for completely purging the spare detector 9 if a malfunction of the primary detector 5 necessitates the use of the spare detector 9, thus minimizing downtime.

Turning now to the electrical components of the radiation detector assembly 3, an input cable 151 individually connects in parallel the anode lead wires 131a–131e to separate power and amplifier circuits of the radiation detector circuitry 149. This circuitry 149 is adjusted by a means of switching controls 152. The circuitry 149 includes a microprocessor whose output is transmitted along an output cable 153 to the previously discussed display panel 169 of the apparatus 1. In the preferred embodiment, circuitry 149 is a Model RM-22 Radiation Monitor by Eberline, a subsidiary of Thermo Instrument Systems, Inc., located in Santa Fe, N.M. This monitor includes a Model 8085 microprocessor with four 2K byte No. 2716EPROMVIC boards, three 256-8 bit bytes Model 8155RAMVIC boards, a NVRAM module to retain memory in case of a power failure, as well as a 15 channel counterboard to interface TTL level pulses into the microprocessor. The cable 151 connects each of the anodes 121a–121e to its own separate amplifier-discriminator board and card cage. These anodes are each individually powered by a P-21B HV power supply also manufactured by Eberline.

Separate power lines 155a and 155b provide power from a surge suppressor 156 to hood lights 159 and a Sonalert 161 located in the upper portion of the shielding cabinet 11, and to the detector circuitry 149 respectively. The input end of the surge suppressor 156 is in turn connected to a source of electrical power 157. In the preferred embodiment, surge suppressor 156 is a Model 1A815 transient surge suppressor manufactured by Dayton Electric Manufacturing Company of Chicago, Ill. Finally, a mat switch 164 is electrically connected to the radiation detector 149 for automatically actuating both the detector 149 and the hood lights 159 when a potential user stands thereon. The use of a mat switch 164 to actuate the apparatus 1 advantageously eliminates the need for manual buttom controls which are apt to accumulate radioactive dust.

The apparatus may be operated in one of two modes. In the first mode, the mat switch 164 is placed on the floor in front of the apparatus 1 just in front of the access opening 13 so that the detector monitor 149 and hood lights 159 will automatically be actuated as soon as a potential user steps up to the apparatus adjacent to the axis opening 13. The user then stands on the mat switch 164, thereby actuating the radiation detection circuitry 149 and hood lights 159. He then inserts the tool or other object to be scanned through access opening 13 and onto the platform screen assembly 111 on the top side of the detector 7. He then waits for the circuitry to render a radiation count on the display 71 of the panel 69. This should take only 2 to 5 seconds, as the detector 7 is highly sensitive to beta radiation. After the count has been completed, he turns the tool onto its opposite side and again waits for a reading. He repeats the process until a reading is taken on every side of the tool.

In the second mode of operation illustrated in FIG. 8, the operator places the mat switch 164 beside one of the sides 28a, 28b of the apparatus 1. He then opens side doors 32a, 32b into the shelf position as shown. He next places a shallow support table 165 through access opening 13. Another gas-flow proportional detector 167 is laid on the top surface of the table 165. The operator then stands onto mat switch 164, thereby actuating the radiation detection circuitry 149 and hood lights 159. The apparatus 1 is now ready to receive elongated objects, such as scaffold members, which are drawn between the detectors 5 and 167, which simultaneously scan both the upper and lower surfaces of such members, thereby allowing all necessary readings to be taken on a single passthrough. This second mode of operation is well suited for tools or scaffold members having uniform thickness.

Before the commencement of either mode of operation, the amount of lead shielding slid into the pockets defined with the walls 23a, 23b, 25, 27 and 29 will have been adjusted in accordance with the amount of background radiation present in the area where the apparatus 1 is set up.

We claim:

1. An apparatus for detecting radiation in hand-holdable objects, comprising:
   a. a radiation detector assembly including a radiation detector means having a top side that is sensitive to both beta and gamma radiation throughout its area, and a platform means disposed over the top side of the detector means for both supporting the hand-holdable object being examined and for uniformly spacing the object from the detector means, and
   b. a shielding cabinet for containing the radiation detector assembly and shielding the detector means from background radiation, said cabinet having an access opening for allowing an operator to deposit and withdraw an object onto and the off of the platform means.

2. The apparatus defined in claim 1, wherein the detector means includes a plurality of mutually adjacent zones, each of which is independently sensitive to radioactivity for indicating which portions of a particular object are contaminated with radioactive particles.

3. The apparatus defined in claim 2, wherein said detector means is a gas-flow proportional detector having a single conductive housing for forming one electrode of one charge, and a plurality of parallel electrode wires for forming multiple electrodes of an opposite charge.

4. The apparatus defined in claim 3, wherein said radiation detector assembly includes a source of pressurized counting gas fluidly connected to said gas-flow proportional detector for constantly replenishing the counting gas within the detector.

5. The apparatus defined in claim 4, wherein the radiation detector assembly includes a spare gas-flow proportional detector that is likewise fluidly connected to said source of pressurized counting gas so that said spare detector will be substantially purged and ready for operation in the event of a malfunction of said original detector.

6. The apparatus defined in claim 1, wherein said platform means includes a perforated sheet of metal wherein the area of the openings in the sheet takes up at least 60 percent of the area of the sheet to render the sheet substantially conductive to beta radiation.

7. The apparatus defined in claim 1, wherein the platform means includes a removable protective film for preventing lint and debris from entering the detector means.

8. The apparatus defined in claim 7, wherein said film is a film of flexible plastic material.

9. The apparatus defined in claim 8, wherein the density thickness of said film is between 0.2 and 0.8 mg/cm$^2$.

10. The apparatus defined in claim 6, wherein said platform means further includes a support grid for supporting both a film of aluminized flexible plastic material and said perforated sheet of metal.

11. The apparatus defined in claim 1, wherein said shielding cabinet includes a sheet of shielding material supporting the detector means, for shielding the detector means from background radiation and for reflecting a portion of the gamma radiation that the top side of the detector means is exposed to in order to increase the gamma radiation sensitivity of the detector means.

12. The apparatus defined in claim 1, wherein said shielding cabinet includes at least one cabinet door for providing additional access to the top side of the detector means.

13. The apparatus defined in claim 1, wherein said shielding cabinet includes cabinet doors on opposing sides to allow objects longer than the width of the shielding cabinet to be passed over the top side of the detector means.

14. The apparatus defined in claim 1, wherein at least some of the walls of the shielding cabinet include a pocket means for receiving a sheet of shielding material.

15. The apparatus defined in claim 14, further including an end cap means for opening and closing said pocket means.

16. The apparatus defined in claim 15, wherein said pocket means is of sufficient size to receive more than one sheet of shielding material so that the amount of radiation afforded by the walls of the shielding cabinet may be varied.

17. The apparatus defined in claim 1, further including a support cabinet for supporting said shielding cabinet.

18. The apparatus defined in claim 1, further comprising a foot-switch means for actuating the detector means.

19. The apparatus defined in claim 1, further comprising a support cabinet means for both supporting the shielding cabinet and for housing radiation detector circuitry that is electrically connected to the radiation detector means.

20. The apparatus defined in claim 12, wherein said cabinet door forms a shelf leading into the top side of the detector means when opened.

21. An apparatus for detecting radiation in handholdable objects, comprising:
   a. a radiation detector assembly including a first radiation detector means having a top side that is sensitive to both beta and gamma radiation throughout substantially all of its area, wherein the area of the top side includes a plurality of mutually overlapping zones, each of which is independently sensitive to radioactivity for both increasing the sensitivity of the detector means as a whole over background radiation and for facilitating locating which particular area of an object is contaminated with radioactive particles, and a platform means including a section of sheet material having a plurality of openings disposed over the top side of the detector means, wherein the area of the openings is at least 70 percent of the area of the sheet material as a whole to allow said sheet material to substantially conduct beta radiation, and
   b. a shielding cabinet for containing the radiation detector assembly and shielding the detector means from background radiation, said shielding cabinet having an access opening for allowing an operator to deposit and withdraw an object onto and off of the platform means.

22. The apparatus defined in claim 21, wherein said shielding cabinet includes doors on opposing sides of the cabinet and door support assemblies for pivotally connecting each of said doors along one of its sides to the cabinet, and wherein each door support assembly substantially aligns the respective door with the top side of the radiation detector means when said doors are opened so that said doors may be used as shelves.

23. The apparatus defined in claim 22, wherein said door support assemblies each include an elongated link member that is slidably engaged with a rivet.

24. The apparatus defined in claim 21, wherein said detector means is a gas-flow proportional detector having a single conductive housing for forming one electrode of one charge, and a plurality of parallel electrode wires for forming multiple electrodes of an opposite charge.

25. The apparatus defined in claim 21, wherein the platform means includes a screen member and a removable protective film for preventing lint and debris from entering the detector means.

26. The apparatus defined in claim 25, wherein said film is a film of flexible plastic material.

27. The apparatus defined in claim 26, wherein the density thickness of said film is between 0.2 and 0.8 $mg/cm^2$.

28. The apparatus defined in claim 26, wherein said platform means further includes a support grid for supporting both a film of aluminized flexible plastic material as well as said screen member.

29. The apparatus defined in claim 21, wherein said shielding cabinet includes a sheet of shielding material for supporting the detector means, shielding the detector means from background radiation and for reflecting a portion of the gamma radiation that the top side of the detector means is exposed to in order to increase the gamma radiation sensitivity of the detector means.

30. The apparatus defined in claim 21, wherein at least some of the walls of the shielding cabinet include a pocket means for removably mounting a sheet of shielding material.

31. The apparatus defined in claim 30, further including an end cap means for opening and closing said pocket means.

32. The apparatus defined in claim 31, wherein said pocket means is of sufficient size to receive more than one sheet of shielding material so that the amount of radiation afforded by the walls of the shielding cabinet may be varied.

33. The apparatus defined in claim 31, further comprising a foot-switch means for actuating the detector means.

34. The apparatus defined in claim 21, further comprising a support cabinet means for both supporting the shielding cabinet and for housing a radiation detector circuitry that is electrically connected to the radiation detector means.

35. The apparatus defined in claim 21, wherein the access opening is orthogonally oriented with respect to the radiation sensitive, top most side of the detector means to minimize the exposure of the detector means to background radiation.

36. The apparatus defined in claim 35, wherein the access opening is offset with respect to the detector means to prevent direct rays of background radiation from striking the detector means.

37. The apparatus defined in claim 21, further including a support table means for supporting a second detector means over the first detector means, and for defining a space between said first and second detectors that elongated objects may be conducted through.

* * * * *